US012736347B2

(12) United States Patent
Sahliger et al.

(10) Patent No.: US 12,736,347 B2
(45) Date of Patent: Sep. 15, 2026

(54) METHOD AND DEVICE FOR COMPENSATING VERTICAL MAGNETIC DEFAULTS OF A MAGNETOMETER INSTALLED IN AN AIRCRAFT

(71) Applicant: THALES, Courbevoie (FR)

(72) Inventors: Frédéric Sahliger, Valence Cedex (FR); Jean-Claude Bourland, Valence Cedex (FR)

(73) Assignee: THALES, Courbevoie (FR)

( * ) Notice: Subject to any disclaimer, the term of this patent is extended or adjusted under 35 U.S.C. 154(b) by 540 days.

(21) Appl. No.: 18/108,333

(22) Filed: Feb. 10, 2023

(65) Prior Publication Data

US 2023/0258452 A1 Aug. 17, 2023

(30) Foreign Application Priority Data

Feb. 16, 2022 (FR) ..................................... 22 01355

(51) Int. Cl.
*G01C 21/08* (2006.01)
*G01C 21/16* (2006.01)
*G01C 23/00* (2006.01)

(52) U.S. Cl.
CPC ........... *G01C 21/188* (2020.08); *G01C 21/08* (2013.01); *G01C 23/005* (2013.01)

(58) Field of Classification Search
CPC ..... G01C 21/188; G01C 21/08; G01C 23/005
See application file for complete search history.

(56) References Cited

U.S. PATENT DOCUMENTS 7,146,740 B2 * 12/2006 Manfred ................ G01C 17/38 33/351
2016/0178371 A1 * 6/2016 Morrison ............... G01C 17/38 702/95
2018/0112980 A1 4/2018 Diem et al.
2020/0304948 A1 * 9/2020 Bourland ............... G01B 7/004

FOREIGN PATENT DOCUMENTS

FR 3 094 082 9/2020
JP 2003-121518 A * 4/2002

OTHER PUBLICATIONS

Search Report for FR Application No. 2201355 dated Oct. 4, 2022, 2 pages.

* cited by examiner

*Primary Examiner* — Lina Cordero
*Assistant Examiner* — Lydna Dinh
(74) *Attorney, Agent, or Firm* — NIXON & VANDERHYE

(57) ABSTRACT

The present method includes a first step of obtaining first values of compensation coefficients for magnetic anomalies of the magnetometer, and a second step of in-flight refining including: a) an acquisition of a plurality of magnetic field vector values and associated aircraft attitude angle values; b) a calculation of a magnetic heading as a function of the first values of the compensation coefficients and values of magnetic field vector; c) a recursive calculation of a slope coefficient, as a function of a difference in heading between the calculated magnetic heading and a reference magnetic heading, and of values for aircraft attitude angles; and d) a calculation of a value of compensation coefficient for vertical magnetic anomalies using a vertical bias estimator as a function of the slope coefficient, aircraft attitude angle values, and local terrestrial magnetic field values.

11 Claims, 4 Drawing Sheets

METHOD AND DEVICE FOR COMPENSATING VERTICAL MAGNETIC DEFAULTS OF A MAGNETOMETER INSTALLED IN AN AIRCRAFT

CROSS-REFERENCES TO RELATED APPLICATIONS

This application claims priority to French Patent Application No. 22 01355, filed Feb. 16, 2022, the entire disclosure of which is incorporated by reference herein.

BACKGROUND OF THE INVENTION

Field of the Invention

The present invention relates to a method and a system for compensating vertical magnetic anomalies of a magnetometer installed in an aircraft.

The invention lies in the field of aircraft piloting, and more particularly in the field of determining the heading of an aircraft by means of magnetic measurements.

Description of the Related Art

In the field of aircraft piloting, in a known manner, one of the problems which arises is the problem of determining, with good precision, the heading of the aircraft with respect to the magnetic heading, as measured using a measuring instrument, e.g. a back-up magnetometer, installed on or in the aircraft. The orientation of the aircraft in a selected frame of reference, also called aircraft attitude, is defined by yaw, pitch, roll angles. In a known manner, the measurements of a magnetometer on board a vehicle are disturbed by magnetic fields induced by the vehicle. In particular, magnetic disturbances are due to the presence of permanently magnetized ferromagnetic materials or electrical conductors through which established currents flow (also called "hard irons") and ferromagnetic materials which are either not magnetized or are magnetized in a reversible manner (also called "soft irons") leading to an error as a function of the attitude of the aircraft, fields induced by eddy currents, alignment errors of the magnetometer with respect to the reference frame of the aircraft (harmonization errors). A compensation for induced magnetic anomalies and a harmonization of geometric misalignment have to be applied to obtain measurements conforming with the expected performance.

There are methods known in the prior art which estimate compensation values to be applied, the estimation being based on complete 3-dimensional models of magnetic disturbances, such type of estimation method being generally complex and sensitive to measurement noise. Moreover, such methods generally require specific prescribed maneuvers for obtaining measured magnetic field values which are sufficient for performing the calculations of compensation values, which is costly and generally undesirable.

Patent FR 3094082 B1 proposes a method for estimating the harmonization values of a magnetometer, including the acquisition of a plurality of magnetic field vector values measured by a magnetometer corresponding to successive positions of the aircraft on the ground, on a plane ground inclined by less than 2°, corresponding to varied successive headings. Such method can be used for obtaining horizontal geometric harmonization values with good accuracy. During such step of harmonization on the ground, the magnetic compensation close to the horizontal is also carried out by methods known to a person skilled in the art.

When the aircraft is on the ground, magnetic measurements are rather insensitive to vertical magnetic anomalies. Thereby, working in a horizontal plane does not allow vertical magnetic anomalies to be identified and compensated for.

However, under flight conditions and in particular when the attitude (or longitudinal inclination of the aircraft) of the aircraft is not horizontal, the heading error associated with the vertical magnetic anomalies is significant. If vertical magnetic anomalies are not properly identified and compensated for, the accuracy of the heading will not then reach the expected performance of a back-up magnetometer in-flight.

Vertical magnetic anomalies are geometrically observable in an attitude configuration departing from the horizontal.

The subject matter of the invention is to remedy the aforementioned drawbacks of the prior art by proposing an estimation of vertical magnetic anomalies in-flight, and a compensation for the vertical magnetic anomalies.

SUMMARY OF THE INVENTION

To this end, the invention proposes, according to one aspect, a method for compensating for vertical magnetic anomalies of a magnetometer installed in an aircraft, the magnetometer being associated with the coordinate frame $X_M$, $Y_M$, $Z_M$ thereof and the aircraft being associated with the aircraft frame $X_A$, $Y_A$, $Z_A$ thereof. Such method, as implemented by a processor of a programmable electronic device, includes:

- a first step of obtaining first values of compensation coefficients for magnetometer magnetic anomalies, the compensation coefficients corresponding to the Euler angles associated with a rotation which changes from the reference coordinate frame of the magnetometer to the aircraft coordinate frame,
- a second refining step including the estimation of at least one compensation coefficient for the magnetometer's vertical magnetic anomalies, implemented in a flight phase, the second step comprising:
  - a) an acquisition of a plurality of values for the magnetic field vectors, as measured by the in-flight magnetometer and of values for associated aircraft attitude angles,
  - b) a calculation of a magnetic heading as function of the first values for compensation coefficients from the first step and the acquired magnetic field vector values,
  - c) a recursive calculation of a coefficient, called the slope coefficient, as a function of a difference in heading between the calculated magnetic heading and a reference magnetic heading, and of values for aircraft attitude angles,
  - d) a calculation of a value of compensation coefficient for vertical magnetic anomalies, using a vertical bias estimator, using the calculated slope coefficient, aircraft attitude angle values and characterizing values of the local terrestrial magnetic field.

Advantageously, the method of compensating vertical magnetic anomalies according to the invention makes it possible to refine first values of magnetic compensation obtained on the ground, and in particular to obtain and refine a value of vertical magnetic compensation.

The method for vertical magnetic anomalies according to the invention can further have one or a plurality of the features below, taken independently or according to all technically feasible combinations.

The first step includes an estimation on ground of first values of compensations coefficients for horizontal magnetic anomalies of the magnetometer.

The first step includes an estimation of the first values of compensation coefficients for magnetic anomalies by generic compensation coefficients coming from a predefined model of magnetic anomalies depending on a type of aircraft.

The recursive calculation of a slope coefficient is a calculation using recursive least squares.

The method further includes calculating compensated magnetic field components from a measured magnetic field vector and the first values of the compensation coefficients for magnetic anomalies, prior to the calculation of the magnetic heading.

The method further includes a step of updating the vertical component of the compensated magnetic field, as a function of the calculated value of compensation coefficient for vertical magnetic anomalies.

The steps a) to d) of the second refining step are iterated, and the value of compensated magnetic field vertical component is fed into a subsequent iteration of the method in the calculation step of the compensated magnetic field component.

The slope coefficient is related to the heading deviation and to the attitude angle values of the aircraft, by the formula:

$$\delta\psi\_i=\alpha\_i\cdot(\sin(\psi\_i)\sin(\theta\_i)\cos(\varphi\_i)-\cos(\psi_i)\sin(\varphi\_i))$$

Where i is an iteration index, α_i is the slope coefficient, δψ_i is the heading deviation, φ_l, θ_i, ψ_i, are the aircraft attitude angles of roll, pitch and yaw, respectively.

A vertical bias estimator is calculated, for the iteration of index i according to the formula:

$$\Delta\hat{H}_{Z\_i}=\frac{-H_{0m_i}\cdot\cos(\text{I\_i})\cdot\alpha\_\text{i}}{1-\alpha\_\text{i}\cdot(\sin(\psi_i)\cdot\sin(\varphi_i)+\cos(\psi\_\text{i})\cdot\sin(\theta\_\text{i})\cdot\cos(\varphi\_\text{i}))}$$

Where $\Delta\hat{H}_Z$_i is the vertical bias estimator, $H_{0m\_i}$ is the norm of the measured local terrestrial magnetic field, l_i is the inclination of the terrestrial magnetic field in radians, α_ι is the slope coefficient and φ_i, θ_l, ψ_l, are the aircraft attitude angles of roll, pitch and yaw, respectively.

Since the aircraft follows a trajectory in the flight phase, the method uses a geometric observability criterion combining a cumulative deviation of a solid pitch and roll angle and a change of heading in the trajectory, satisfying the geometric observability criterion making it possible to define a condition of implementation in-flight of the estimation of at least one compensation coefficient for vertical magnetic anomalies in an appropriate observability phase.

According to another aspect, the invention relates to a device for compensating for the vertical magnetic anomalies of a magnetometer installed in an aircraft, the magnetometer being associated with the reference coordinate frame $X_M$, $Y_M$, $Z_M$ thereof and the aircraft being associated with the aircraft frame $X_A$, $Y_{A,Z\ A}$ thereof, the device including a processor configured for implementing:

- a module for obtaining first values of compensation coefficients for magnetometer magnetic anomalies, the compensation coefficients corresponding to the Euler angles associated with a rotation for changing from the reference coordinate frame of the magnetometer to the aircraft coordinate frame,
- a set of modules, implemented in a flight phase, configured for implementing a refinement which includes the estimation of at least one compensation coefficient for the magnetometer's vertical magnetic anomalies, comprising:
  - a module for acquiring a plurality of magnetic field vector values measured by the magnetometer in-flight and associated aircraft attitude angle values,
  - a module for calculating a magnetic heading as a function of the first values of compensation coefficients from the first step and acquired magnetic field vector values,
  - a module for the recursive calculation of a coefficient, called the slope coefficient, as a function of a difference in heading between the calculated magnetic heading and a reference magnetic heading, and of values for aircraft attitude angles,
- a module for calculating a value of the compensation coefficient for vertical magnetic anomalies using a vertical bias estimator, using the calculated slope coefficient, aircraft attitude angle values and characterizing values of the local terrestrial magnetic field.

According to another aspect, the invention relates to a computer program including software instructions which, when executed by a programmable electronic system, implement a method for compensating vertical magnetic anomalies, as briefly described hereinabove.

BRIEF DESCRIPTION OF THE DRAWINGS

Other features and advantages of the invention will be clear from the description thereof which is given below as a non-limiting example, with reference to the enclosed figures, among which.

DESCRIPTION OF THE PREFERRED EMBODIMENTS

Figure 1:
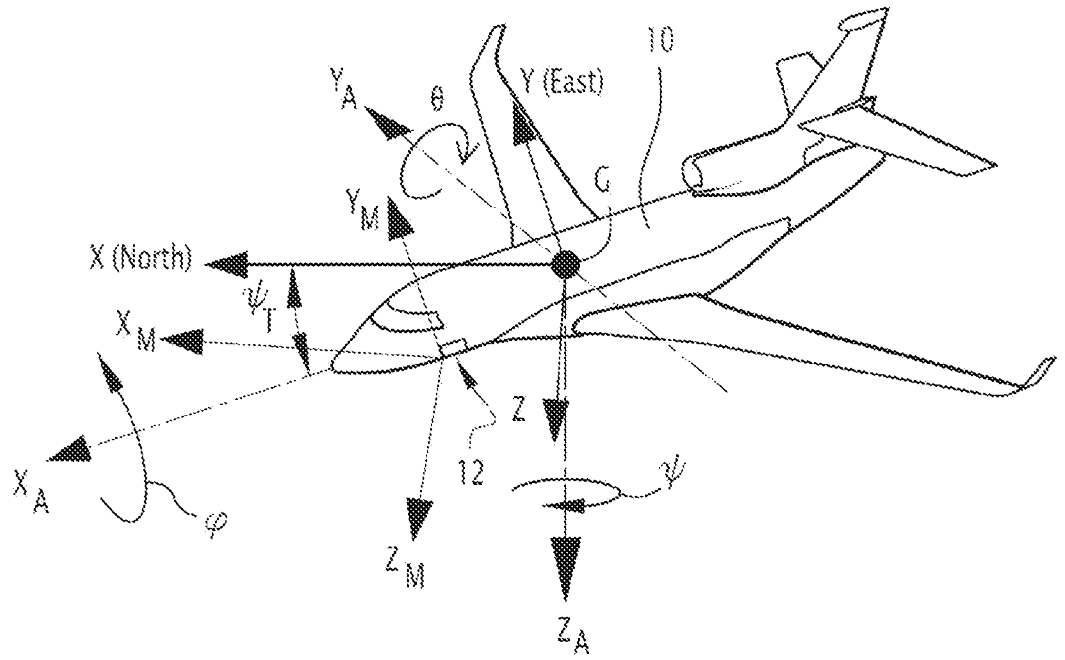
FIG. 1 is a schematic representation of an aircraft equipped with a magnetometer and the respective associated coordinate frames.
Figure 2:
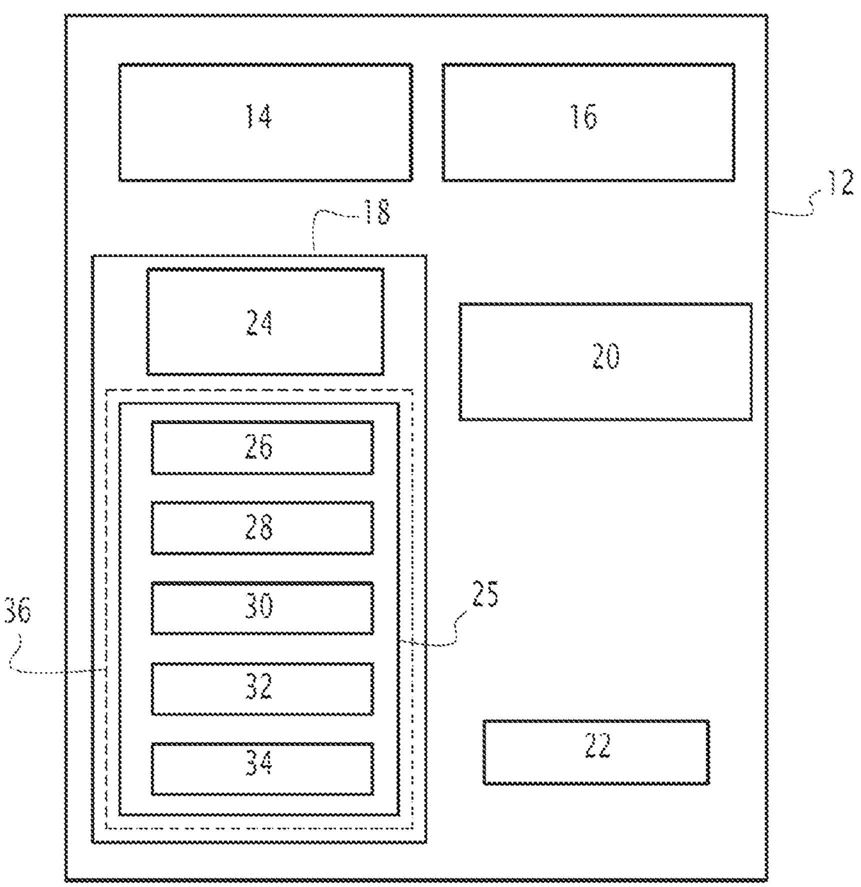
FIG. 2 is a schematic representation of an aircraft heading determination system including a compensation device for vertical magnetic anomalies, according to one embodiment.

FIG. 1 schematically illustrates an aircraft 10 equipped with a heading determination system 12, represented schematically in FIG. 2.

The aircraft 10 has an aircraft reference system TA, of origin G, which is a reference point, e.g. the center of gravity thereof or any other reference point of the structure thereof. The aircraft coordinate frame includes three axes $X_A$, $Y_A$, $Z_A$ which are perpendicular to each other, the axis $X_A$ being the longitudinal axis of the aircraft, oriented towards the nose of the aircraft. The longitudinal axis of the aircraft is also called the lubber line of the aircraft. The axis $Y_A$ is perpendicular to $X_A$, in the horizontal plane when the aircraft is on the ground, it is the axis which links the wings, oriented towards the right wing. The $Z_A$ axis is the vertical axis when the aircraft is on the ground, oriented downwards. The aircraft coordinate frame TA is linked to the aircraft.

The attitude of the aircraft while in motion is defined with respect to a TGL (local geographic trihedron also called NorthEastDown) geographic coordinate frame, which is shown in FIG. 1 with the same center as the center G of the aircraft coordinate frame. The coordinate frame TGL comprises 3 axes X, Y, Z perpendicular in pairs, the axis X pointing towards the geographical North, the axis Y pointing towards the geographical East, and the axis Z defining the vertical direction, pointing towards the center of the Earth (Down).

The attitude of the aircraft with respect to the geographical coordinate frame TGL is defined, in a known manner, by three Euler angles making it possible to change from the coordinate frame TGL to the coordinate frame TA of the aircraft, which are the yaw $\psi$, the pitch $\theta$ and the roll $\varphi$, respectively. The angles are shown in FIG. 1.

The yaw $\psi$ corresponds to a rotation of the aircraft about $Z_A$.

The yaw $\Psi_T$, also called geographical heading, represented in FIG. 1, is the angle between the axis $X_A$ and the axis X, corresponding to a rotation of the aircraft about $Z_A$. The pitch represents a rotation about the axis $Y_A$, and the roll represents a rotation about the longitudinal axis $X_A$. Said angles define the matrix for changing the coordinate frame from the reference coordinate frame TGL to the aircraft coordinate frame TA.

The angles $\varphi$ and $\psi$ are defined within$]-\pi,+\pi]$, and $\theta$ is defined within$]-\pi/2,\pi/2]$.

The attitude of the aircraft 10 is obtained by changing the coordinate frame from the coordinate frame TGL to the coordinate frame TA, using the matrix $B(\psi,\theta,\varphi)$, called the direction cosines matrix:

$$B(\psi,\theta,\varphi)=\begin{bmatrix}\cos\psi\cos\theta & -\sin\psi\cos\varphi+\cos\psi\sin\theta\sin\varphi & \sin\psi\sin\varphi+\cos\psi\sin\theta\cos\varphi\\ \sin\psi\sin\theta & \cos\psi\cos\varphi+\sin\psi\sin\theta\sin\varphi & -\cos\psi\sin\varphi+\sin\psi\sin\theta\cos\varphi\\ -\sin\theta & \cos\theta\sin\varphi & \cos\theta\cos\varphi\end{bmatrix} \quad \text{[MATH 1]}$$

The heading determination system 12, shown diagrammatically in FIG. 2, includes a magnetometer 14, an inertial measurement unit 16, a processing device 18 and a human-machine interface 20.

The heading determination system 12 further comprises an instrument 22 called "stand-by attitude" (unit providing the emergency attitudes), suitable for obtaining and displaying the attitudes of the aircraft to the pilot.

The magnetometer 14 is an instrument suitable for providing values of a measured magnetic field, making it possible in particular to indicate the direction of the magnetic North. A magnetometer has its own reference coordinate frame TMAG, shown schematically in FIG. 1, having an origin $O_M$ and axes $X_M$, $Y_M$, $Z_M$ perpendicular to each other. The magnetometer supplies, at each measurement, components $H_{xm}$, $H_{ym}$, $H_{zm}$ forming a three-dimensional vector $[H_m]$.

The yaw angle $\Psi_{mag}$ between the axis $X_A$ (longitudinal axis of the aircraft) and the axis $X_M$ is the magnetic heading according to the magnetometer measurement. As mentioned in the introduction, magnetometer measurements are disturbed by local magnetic anomalies, e.g. magnetic fields induced by the aircraft.

The inertial measurement unit (IMU) 16 usually includes three accelerometers and three gyroscopes and determines the attitude angles of the aircraft 10 in the coordinate frame TGL.

According to a variant, the heading determination system 12 comprises another system for determining position and orientation, e.g. a primary navigation unit or a dual-antenna GPS heading, which supplies the processing unit 18, attitude angles of the aircraft in real-time.

Thereafter, "attitude angles" will refer to the yaw, pitch, roll angles provided by the inertial measurement unit 16 or any other similar device referred to by the term "primary inertial system".

According to another variant, referred to as the "autonomous" configuration mode, the heading determination system 12 is only equipped with a magnetometer, without including a primary inertial system.

The processing device 18 is a programmable electronic device, and comprises a central processing unit (CPU) 24, e.g. a processor, apt to execute computer program instructions when the device 18 is powered on, and an electronic memory unit 25, e.g. registers, the electronic memory unit 25 being suitable for storing executable code instructions for the implementation of programs including code instructions apt to implement the method according to the invention. Thereby, the processing device 18 is a device for compensating the vertical magnetic anomalies of a magnetometer according to the invention.

The processing system 18 is suitable for communicating with the human-machine interface 20, for receiving commands and displaying results, e.g. by means of a communication bus (not shown).

The electronic memory unit 25 is configured for storing:

- a module 26 for obtaining first values of compensation coefficients for magnetic anomalies;
- a set of modules, implemented in a flight phase, configured for implementing a refinement which includes the estimation of at least one compensation coefficient for the magnetometer's vertical magnetic anomalies, comprising:
  - a module 28 for acquiring a plurality of magnetic field vector values measured by the magnetometer 14 in-flight and associated supplied aircraft attitude angle values;
  - a module 30 for calculating a magnetic heading as a function of the first values of the compensation coefficients and acquired magnetic field vector values;
  - a module 32 for the recursive calculation of a coefficient, called the slope coefficient, as a function of a difference between the magnetic heading and a reference magnetic heading and values of aircraft attitude angles
  - a module 34 for calculating a value of compensation coefficient for vertical magnetic anomalies, using the calculated slope coefficient, aircraft attitude angle values and characterizing values of the local terrestrial magnetic field.

In one embodiment, the modules 26, 28, 30, 32, 34 are embodied in the form of software instructions forming a computer program 36 which, when implemented by the programmable electronic device, implements a method for compensating vertical magnetic anomalies of a magnetometer according to the invention.

The modules are implemented in a flight phase, preferably in a configuration of the attitude of the aircraft departing from the horizontal, in particular when the absolute value of longitudinal angle with respect to the horizontal plane is higher than 10°, and preferably higher than 25°.

In a variant (not shown), the modules 26, 28, 30, 32, 34 are each (or part of the modules) embodied in the form of a programmable logic component, such as an FPGA (Field Programmable Gate Array), GPU (graphics processing unit) or a GPGPU (General-purpose processing on graphics processing unit), or further in the form of a dedicated integrated circuit, such as an ASIC (Application Specific Integrated Circuit).

The computer program 36 including software instructions is further apt to be recorded on a computer-readable medium (not shown). The computer-readable medium is e.g. a medium apt to store the electronic instructions and to be coupled to a bus of a computer system. As an example, said medium is an optical disk, a magneto-optical disk, a ROM, a RAM, any type of non-volatile memory (e.g. EPROM, EEPROM, FLASH, NVRAM), a magnetic card or an optical card.

Figure 3:
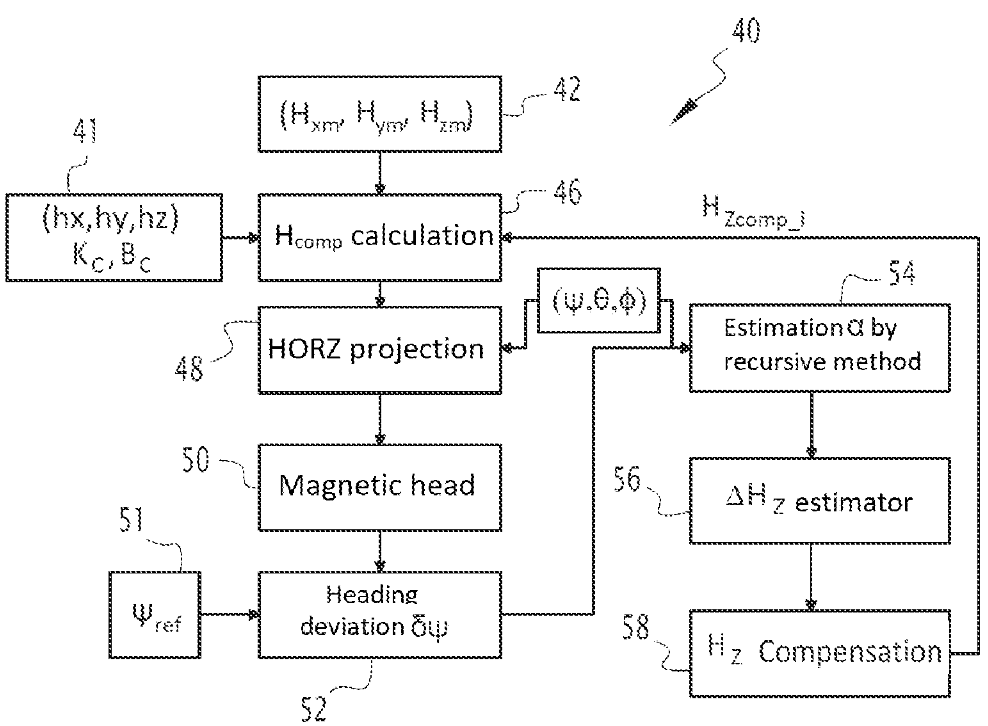
FIG. 3 is an organization chart of the main steps of a method for compensating vertical magnetic anomalies of a magnetometer, according to an embodiment of the invention.

FIG. 3 is a synopsis of the main steps of a method for compensating the vertical magnetic anomalies of a magnetometer, implemented by a processing device 18, according to one embodiment.

The method performs the in-flight estimation and refinement of compensation coefficients for vertical magnetic anomalies, using pre-established data, either on the ground or in the factory.

The method comprises a step 41 of obtaining first values of compensation coefficients for magnetic anomalies.

A general model of magnetic field compensation measured in the coordinate frame TMAG can be written as:

$$\begin{bmatrix} H_{xt} \\ H_{yt} \\ H_{zt} \end{bmatrix} = \begin{bmatrix} K_{cxx} & K_{cxy} & K_{cxz} \\ K_{cyx} & K_{cyy} & K_{cyz} \\ K_{czx} & K_{czy} & K_{czz} \end{bmatrix} \begin{bmatrix} H_{xm} + B_{cx} \\ H_{ym} + B_{cy} \\ H_{zm} + B_{cz} \end{bmatrix} \quad \text{[MATH 2]}$$

With $\overrightarrow{Bc} = \begin{bmatrix} B_{cx} \\ B_{cy} \\ B_{cz} \end{bmatrix}$ the hard iron compensation vector and $[K_c] = \begin{bmatrix} K_{cxx} & K_{cxy} & K_{cxz} \\ K_{cyx} & K_{cyy} & K_{cyz} \\ K_{czx} & K_{czy} & K_{czz} \end{bmatrix}$ the soft iron compensation matrix.

The vector $\overrightarrow{H_t}$ is the theoretical magnetic field vector expressed in the coordinate frame TA, and $\overrightarrow{H_m}$ is the magnetic field vector measured by the magnetometer, expressed in the coordinate frame TMAG.

The first values of magnetic anomaly compensation coefficients are first values of $[K_c]$ and of $\overrightarrow{B_c}$, respectively.

According to a first embodiment, said values are values of compensation coefficients for horizontal magnetic anomalies, preferentially obtained by a method implemented on maneuvers carried out on the ground, as described in patent FR3094082 B1.

In the first embodiment, the vertical components are zero:

$$\overrightarrow{Bc} = \begin{bmatrix} B_{cx} \\ B_{cy} \\ 0 \end{bmatrix}$$

$$[K_c] = \begin{bmatrix} K_{cxx} & K_{cxy} & 0 \\ K_{cyx} & K_{cyy} & 0 \\ 0 & 0 & 1 \end{bmatrix}$$

According to a second embodiment, the first values of coefficients for horizontal and vertical magnetic anomalies are first generic approximations, obtained from a predefined model of magnetic anomalies in the factory, by type of aircraft.

In such a case, first values of three-dimensional compensation coefficients are obtained, for the matrix $[K_c]$ and the vector $\overrightarrow{B_c}$, respectively.

Moreover, first values of harmonization of the alignment anomalies of the magnetometer with the axes of the aircraft, also called geometric anomalies, are obtained in step 41, either by a method implemented on maneuvers carried out on the ground, or from a factory model.

Preferentially, for geometric anomalies, the method for estimating harmonization values is described in patent FR3094082B1. Such method can be used for an estimation on the ground of horizontal harmonization values hx, hy, where hx corresponds to the Euler angle associated with the rotation about $X_A$, and hy corresponds to the Euler angle associated with the rotation about $Y_A$ for changing from the coordinate frame $X_M$, $Y_M$, $Z_M$ of the magnetometer to the aircraft coordinate frame $X_A$, $Y_A$, $Z_A$. Such method of estimating harmonization values makes it possible to obtain, for the horizontal harmonization values, an accuracy on the order of 0.5° with regard to weak soft iron anomalies on the aircraft. Moreover, an estimation, by calculation, of the vertical harmonization value hz is described, the estimated value hz being nevertheless marred by errors.

Preferentially, the method for compensating vertical magnetic anomalies comprises a second refining step comprising the estimation of at least one compensation coefficient for the vertical magnetic anomalies of the magnetometer, implemented in a flight phase, the second step comprising the sub-steps 42 to 58 described below. Steps 42 to 58 are implemented iteratively, each iteration having an associated index i, i being equal to 1 during the first iteration, and being incremented by 1 at each iteration.

The method comprises a step 42 of acquiring the components $H_{mx\_i}$, $H_{my\_i}$; $H_{mz\_i}$, forming a three-dimensional vector $\overrightarrow{H_{m\_i}}$, representing the values of the magnetic field measured by the magnetometer rigidly attached to the aircraft, during the flight phase.

The magnetic field values e.g. are measured at a given rate, e.g. 60 Hz, so as to obtain in-flight measurements at a plurality of time steps and a plurality of attitude values. Such magnetic field measurements (of three-dimensional vectors, measured in the magnetometer coordinate frame) are each recorded in correspondence with the corresponding attitude of the aircraft 10 as delivered by the Inertial Measurement Unit 16.

A compensation 46 can be used for obtaining a vector $[H_{comp\_i}]$ with components $H_{Xcomp\_i}$, $H_{Ycomp\_i}$, $H_{Zcomp\_i}$ compensated from a measured magnetic field vector $\overrightarrow{H_{m\_i}}$, from the first values of compensation coefficients for magnetic anomalies, $[K_c]$, $\overrightarrow{B_c}$, and from the first harmonization values hx, hy, hz, by a calculation method known to a person skilled in the art.

Compensated component vectors $H_{Xcomp\_i}$, $H_{Ycomp\_i}$, $H_{Zcomp\_i}$ are calculated and stored for each vector of values of the measured magnetic field.

The method then comprises a step 48 of projecting the vector $H_{comp\_i}$ for obtaining a horizontal projection vector denoted by $[H_{HORZ\_i}]$, having components $H_{XH\_i}$, $H_{YH\_i}$, $H_{ZH\_i}$ by applying a projection matrix $B_{HORZ}$, corresponding to $B(0, \theta, \varphi)$ defined by the equation [MATH 1]. The projection matrix is defined by:

$$B_{HORZ} = \begin{bmatrix} \cos(\theta) & \sin(\theta)\sin(\varphi) & \sin(\theta)\cos(\varphi) \\ 0 & \cos(\varphi) & -\sin(\varphi) \\ -\sin(\theta) & \cos(\theta)\sin(\varphi) & \cos(\theta)\cos(\varphi) \end{bmatrix} \quad \text{[MATH 3]}$$

In a similar way to what has been described hereinabove, the angles θ,φ also change with the index i of the iteration, which makes it possible to obtain a matrix $B_{HORZ\_i}$ at the ith iteration.

Thereby, the components $H_{XH\_i}$, $X_{YH\_i}$, $H_{ZH\_i}$ are obtained, at the ith iteration, by:

$$\begin{bmatrix} H_{XH\_i} \\ H_{YH\_i} \\ H_{ZH\_i} \end{bmatrix} = B_{HORZ\_i} \cdot \begin{bmatrix} H_{Xcomp\_i} \\ H_{Ycomp\_i} \\ H_{Zcomp\_i} \end{bmatrix} \quad \text{[MATH 4]}$$

The pitch θ and roll φ angular values used in the matrix $B_{HORZ}$ are supplied, e.g. by the inertial unit IUM, and more generally by a primary inertial system.

Thereafter, the method includes an operation 50 for calculating an estimated magnetic heading $\psi_{mag\_i}$, calculated at the ith iteration by the following formula:

$$\psi_{mag\_i} = -a\tan\left(\frac{H_{XH\_i}}{H_{YN}\_i}\right) \quad \text{[MATH 5]}$$

A reference magnetic heading $\psi_{ref}$ is provided in step 51, either by a primary navigation unit or by calculation in an autonomous configuration.

The primary navigation system e.g. uses a precision gyroscope which senses the Earth's rotation and determines the geographic heading, and then calculates the reference magnetic heading by compensation of the magnetic declination and a terrestrial map model.

In an autonomous configuration, the calculation of the reference magnetic heading uses values of compensation coefficients, as calculated during the step 41, and measurements obtained during the step 42. The measurements obtained during the step 42, with a plurality of time steps and a plurality of attitude values, will be used for calculating vertical magnetic compensation coefficients, for a better overall compensation of the measured fields and thereby obtaining a better precision of the calculated magnetic heading, even for non-horizontal attitudes.

The heading deviation δψ_i between the estimated magnetic heading $\psi_{mag\_i}$ and the reference magnetic heading $\psi_{ref\_i}$ is calculated during the estimation step 52 for the magnetic heading deviation. The angles $\psi_{mag\_i}$, $\psi_{ref\_i}$ are expressed in radians.

The heading deviation is calculated by:

$$\delta\psi\_i = \psi_{mag\_i} - \psi_{ref\_i} \quad \text{[Math 6]}$$

The calculated deviation δΨ_i, as well as the angle values for aircraft attitude, are used in a recursive calculation 54 of a slope coefficient, denoted by α_i.

The following formula is applied, the formula explaining the relationship between the magnetic heading deviation and the aircraft attitude angles:

$$\delta\psi\_i = \alpha\_i \cdot (\sin(\psi\_i)\sin(\theta\_i)\cos(\varphi\_i) - \cos(\psi_i)\sin(\varphi\_i)) \quad \text{[Math 7]}$$

In one embodiment, the slope coefficient α_i is estimated by applying a recursive least squares method. In a variant, Kalman filtering is used for estimating the slope coefficient.

More generally, the slope coefficient is estimated by a recursive estimation method, any known recursive estimation method being applicable.

Such recursive estimation method is iteratively applied to a plurality of measured values of aircraft attitude angles in a flight phase, preferentially in the take-off phase, which leads to obtaining a variety of aircraft positions/orientations. Indeed, in the take-off phase, the aircraft is piloted to climb and make at least one turn.

Attitude measurements e.g. are made with a frequency of 60 Hz, and for each aircraft attitude angle measurement, the corresponding magnetic heading deviation δΨ_l is estimated.

The slope coefficient α_i e.g. is estimated over 180° heading, 30° roll and 15° pitch.

The slope coefficient α_i is used in the estimation 56 of a value of the compensation coefficient for vertical magnetic anomaly, $\Delta\vec{H}_{Z\_i}$, also called vertical bias, by applying the estimator given by the following formula, developed by the inventors:

$$\Delta\hat{H}_{Z\_i} = \frac{-H_{0m\_i} \cdot \cos(\mathrm{I}\_\mathrm{i}) \cdot \alpha\_\mathrm{i}}{1 - \alpha\_\mathrm{i} \cdot (\sin(\psi_i) \cdot \sin(\varphi_i) + \cos(\psi\_\mathrm{i}) \cdot \sin(\theta\_\mathrm{i}) \cdot \cos(\varphi\_\mathrm{i}))} \quad \text{[MATH 8]}$$

Where $H_{0m\_i}$ is the norm of the measured local earth magnetic field, the formula of which is, in a known manner:

$$H_{0m\_i} = \sqrt{H_{xm\_i}^2 + H_{ym\_i}^2 + H_{zm\_i}^2} \quad \text{[Math 9]}$$

The components $[H_{xm\_i}, H_{ym\_i}, H_{zm\_i}]$ are provided by the magnetometer, and l_i is the inclination of the Earth's magnetic field in radians, estimated by the formula:

$$\mathrm{I}\_\mathrm{i} = -a\tan\left(\frac{H_{ZH\_i}}{\sqrt{H_{XH\_i}^2 + H_{YH\_i}^2}}\right) \quad \text{[MATH 10]}$$

In the formula [MATH 8], the magnetic field values $H_{0m\_i}$ are $\Delta\vec{H}_{Z\_i}$ are expressed in nT (nano Tesla), and the angular values in radian.

Advantageously, the formula [MATH 8] makes it possible to calculate a compensation coefficient value without requiring knowledge of the theoretical terrestrial magnetic field, but only the values of the measured local terrestrial magnetic field, of the attitude angles, of the heading and of the slope coefficient α_i.

Advantageously, the slope coefficient α_l is estimated by a computational method and refined recursively in real-time.

In one embodiment, the step 56 of estimating a compensation coefficient value is followed by a step 58 of updating or refining the refined vertical magnetic field component, making it possible to obtain a compensated vertical magnetic field component at the current iteration:

$$H_{Zcomp\_i} = H_{Zcomp_{i-1}} + \Delta\hat{H}_{Z\_i} \quad \text{[Math 11]}$$

Where i is an integer indicating a current iteration index, (i−1) indicating the previous iteration.

The method can be used for obtaining second values of compensation coefficients for magnetometer anomalies, including in particular, the value $\Delta\vec{H}_Z$ of the compensation coefficient of vertical magnetic anomalies, in particular the vertical hard iron compensation.

The steps 42 to 58 are iterated by replacing the vertical component of the vector [Hcomp] with the value $H_{Zcomp\_i}$ of the vertical component of the magnetic field compensated at the current iteration calculated by the formula [MATH 11], for a selected number of iterations or until an iteration stop criterion is satisfied.

A stop criterion is e.g. checked if the coefficient variation $\Delta\vec{H}_{Z\_i}$ between two successive iterations is less than a predetermined threshold, e.g. the variation between the (i−1)th iteration and the ith iteration being expressed by:

$$|\Delta\hat{H}_{z_i} - \Delta\hat{H}_{z_{(i-1)}}|.$$

The preset time is e.g. comprised e.g. between 30 and 70 nT. According to a simplified alternative, the number of iterations is predetermined.

In one embodiment, the stopping criterion also satisfies a criterion called the geometric observability criterion, which makes it possible to ensure that sufficient distinct maneuvers are carried out, then, once the observability criterion has been validated, the criterion of variation of the coefficient $\Delta\vec{H}_{Z\_i}$ explained hereinabove is implemented.

In one embodiment, the aircraft following a trajectory in the flight phase, the geometric observability criterion combining a cumulative deviation of a solid pitch and/or roll angle and a heading change in the trajectory, the satisfaction of the geometric observability criterion making it possible to define a condition for the implementation in-flight of the estimation of at least one compensation coefficient for vertical magnetic anomalies in an appropriate observability phase.

The geometric criterion of observability e.g. is calculated iteratively by integration (or accumulation of attitude) indicating the solid angle swept in the dimensions φ and θ, and the heading change Ψ. The condition consists e.g. in comparing the value of the cumulation with a first low threshold and a second high threshold, the implementation of the estimation being stopped if the value of the cumulation is lower than the first low threshold or higher than the second high threshold.

Advantageously, the invention proposes an incremental refining in-flight, by a simplified method, more robust than a complete three-dimensional model for estimating the harmonization components.

Advantageously, the proposed method can be used for obtaining a compensation for vertical magnetic anomalies with good precision and with a low computational load.

Advantageously, the method for compensating the vertical magnetic anomalies of a magnetometer is implemented in a flight phase, e.g. at the beginning of flight after take-off and first turns, without requiring the implementation of imposed maneuvers and a wide airspace.

In one configuration, the method does not require any precise magnetic heading reference and can be applied to aircraft which do not have a precise magnetic heading reference (provided by a primary system or a magnetic model), or can enhance the autonomy of a standby magnetometer.

In another configuration, the method for compensating vertical magnetic anomalies uses first compensation values from generic compensation coefficients coming from a predefined model, e.g. in the factory, for each type of aircraft. In this way it is unnecessary to compensate beforehand on the ground on a dedicated compensation area for each aircraft of the same type, thereby providing an economic savings in maintenance.

The principle of iterative estimation explained above applies to the refining of field components by a recursive (or incremental) estimation in-flight.

Figure 4:
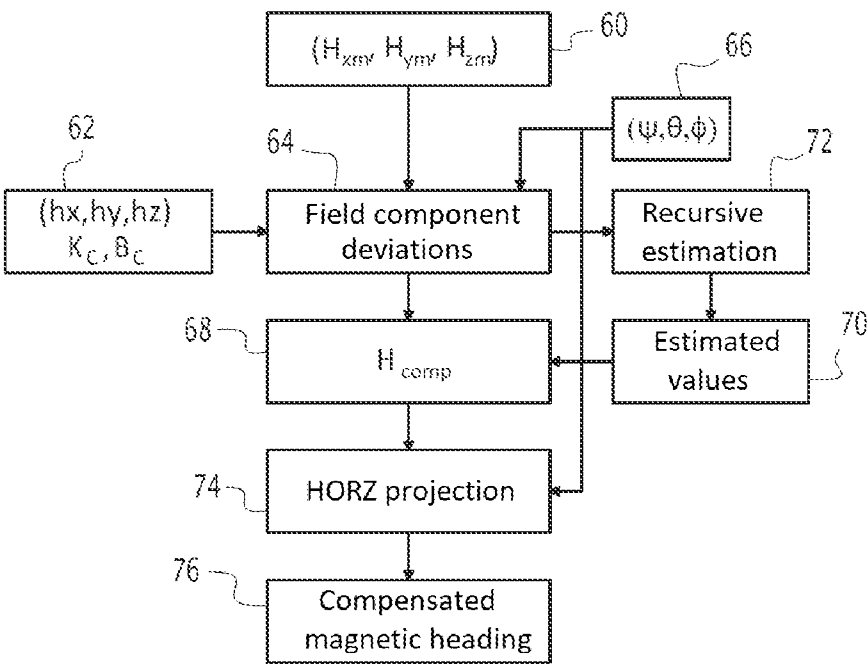
FIG. 4 is an organization chart of the main steps of a method for refining field components by recursive estimation in-flight.

An embodiment of a method for refining field components by recursive estimation is described hereinafter with reference to FIG. 4.

The method comprises a step 60 of acquiring a plurality of magnetic field vector values measured by the magnetometer in-flight and associated aircraft attitude angle values, similar to the step 42 described hereinabove.

In this way it is possible to acquire the components $H_{mx\_iI}$, $H_{my\_i}$; $H_{mz\_i}$, forming a three-dimensional vector $\overrightarrow{H_{m\_\imath}}$ representing the values of the magnetic field measured by the magnetometer rigidly attached to the aircraft, during the flight phase.

The method comprises a step 62 of obtaining first values of compensation coefficients for magnetic anomalies of the magnetometer, the first values being obtained on the ground, as explained above with reference to the step 41 or being predefined depending on the type of aircraft (factory model).

During a step 64, the calculation of a field component deviation is carried out, taking into account pitch θ and roll φ, and optionally yaw angular values ψ, supplied (step 66) e.g. by the inertial unit IUM, and more generally by a primary inertial system.

Field component deviations $\delta H_{xm\_i}$, $\delta H_{yxm\_i}$, $\delta H_{zm\_i}$ are obtained, where i is an iteration index.

A vector Hcomp_i comprising compensated components $H_{Xcomp\_i}$, $H_{Ycomp\_i}$, $H_{Zcomp\_i}$ is then calculated and stored during the step 68.

The calculation of the step 68 implements an estimated vertical bias value ΔHz as well as estimated components Kcxz, Kcyz of the soft iron compensation matrix Kc, said components being estimated during the step 70, following the implementation of a recursive estimation step 72.

The recursive estimation 72 is a ground model estimation fed into an equation with the differences between the two measured field components (horizontal and vertical) and the compensated field components of the identified ground model, so as to identify in-flight, the supplementary parameters for vertical anomalies, including the vertical bias of dominant hard iron ΔHz.

The recursive estimation 72 takes as input, the deviations of components calculated during the step 64, as well as an observability criterion, e.g. such as the FOP (Field of Precision).

The recursive estimation 72 takes as input the component deviations calculated during the step 64, as well as an observability criterion, e.g. such as the iterative geometric calculation combining the accumulation of a solid angle deviation in pitch/roll and a heading angle deviation, thereby proposing a concept of "Field of Precision" in the magnetic field domain, in a single integrated criterion.

A recursive least squares estimation algorithm e.g. is implemented.

The method then comprises steps of horizontal projection 74 (analogous to the step 48 previously described) and of calculation of compensated magnetic heading (analogous to the step 76 previously described).

Such refining process has a good signal-to-noise ratio of estimation in the domain of field components, the numerical equations with differences having no quadratic terms nor higher power terms and benefiting from more than an input from the algorithm only when the combined observability criterion detects sufficient observability per predefined threshold which can be justified by the conjunction of a sufficient change of pitch, roll and heading.

Advantageously, the implementation of an observability criterion according to the invention makes it possible to provide the bias estimation only during an appropriate observability phase, thereby optimizing a rapid estimation at the start of flight with a better estimation quality.

The invention claimed is:

1. A method for compensating vertical magnetic anomalies of a magnetometer used for piloting an aircraft, the magnetometer being associated with a reference coordinate frame $X_M$, $Y_M$, $Z_M$ thereof and the aircraft being associated with an aircraft coordinate frame $X_A$, $Y_A$, $Z_A$ thereof, the method, as implemented by a processor of a programmable electronic device, comprising:

- a first step of obtaining first values of compensation coefficients for magnetic anomalies of a magnetometer installed in the aircraft, the compensation coefficients corresponding to the Euler angles associated with a rotation which changes from the reference coordinate frame of the magnetometer to the aircraft coordinate frame, and
- a second step including an estimation of at least one compensation coefficient for vertical magnetic anomalies of the magnetometer, implemented during flight of the aircraft, the second step comprising:
  - a) an acquisition of a plurality of values for magnetic field vectors, as measured the in-flight by the magnetometer and values of in-flight attitude angles of the aircraft,
  - b) a calculation of a magnetic heading as a function of the first values of compensation coefficients from the first step and the acquired values for magnetic field vector,
  - c) a recursive calculation of a slope coefficient, as a function of a difference in heading between the calculated magnetic heading and a reference magnetic heading, and values of the aircraft attitude angles, and
  - d) a calculation of a value of the compensation coefficient for vertical magnetic anomalies, using a vertical bias estimator, using the calculated slope coefficient, the aircraft attitude angle values and characterizing values of a local terrestrial magnetic field;
- the method further comprising applying said compensation coefficient for vertical magnetic anomalies to compensate vertical magnetic anomalies of the magnetometer and to harmonize alignment of the magnetometer with respect to the aircraft coordinate frame, and updating a value of a compensated vertical component of the magnetic field, as a function of the calculated value of the compensation coefficient for vertical magnetic anomalies.

2. The method according to claim 1, wherein the first step includes an estimation on ground of first values of compensations coefficients for horizontal magnetic anomalies of the magnetometer.

3. The method according to claim 1, wherein the first step includes an estimation of the first values of the compensation coefficients for magnetic anomalies by generic compensation coefficients coming from a predefined model of magnetic anomalies depending on a type of aircraft.

4. The method according to claim 1, wherein the recursive calculation of the slope coefficient is a calculation using recursive least squares.

5. The method according to claim 1, further including a calculation of compensated magnetic field components from a measured magnetic field vector and the first values of the compensation coefficients for magnetic anomalies prior to the calculation of the magnetic heading.

6. The method according to claim 1, wherein the second step is iterated, and wherein the value of the compensated vertical component of the magnetic field is fed into a subsequent iteration.

7. The method according to claim 6, wherein the slope coefficient is related to a heading deviation and to the aircraft attitude angle values of the aircraft, by the formula:

$$\delta\psi\_i = \alpha\_i \cdot (\sin(\psi\_i)\sin(\theta\_i)\cos(\varphi\_i) - \cos(\psi_i)\sin(\varphi\_i))$$

where i is an iteration index, α_i is the slope coefficient, δψ_i is the heading deviation, φ_l, θ_i, ψ_i are the aircraft attitude angles of roll, pitch and yaw, respectively.

8. The method according to claim 7, wherein the vertical bias estimator is calculated, for the iteration of index i, according to the formula:

$$\Delta\hat{H}_{Z\_i} = \frac{-H_{0m_i} \cdot \cos(I\_i) \cdot \alpha\_i}{1 - \alpha\_i \cdot (\sin(\psi_i) \cdot \sin(\varphi_i) + \cos(\psi\_i) \cdot \sin(\theta\_i) \cdot \cos(\varphi\_i))}$$

where $\Delta\hat{H}_Z$_i is the vertical bias estimator, $H_{0m\_i}$ is the norm of the measured local terrestrial magnetic field, I_i is the inclination of the terrestrial magnetic field in radians, α_ι is the slope coefficient and φ_i, θ_l, ψ_l, are the aircraft attitude angles of roll, pitch and yaw, respectively.

9. The method according to claim 1, the aircraft following a trajectory in the flight phase, the method implementing a geometric observability criterion combining a cumulative deviation of a solid pitch and roll angle and a heading change in the trajectory, satisfying the geometric observability criterion making it possible to define a condition of implementation in-flight of the estimation of at least one compensation coefficient for vertical magnetic anomalies in an appropriate observability phase.

10. A non-transitory computer-readable medium on which is stored a computer program including software instructions which, when executed by a programmable electronic system, implement a method for compensating vertical magnetic anomalies of a magnetometer according to claim 1.

11. A device for compensating vertical magnetic anomalies of a magnetometer used for piloting an aircraft, the magnetometer being associated with a reference coordinate frame $X_M$, $Y_M$, $Z_M$ thereof and the aircraft being associated with an aircraft coordinate frame $X_A$, $Y_A$, $Z_A$ thereof, the device comprising a processor configured for implementing:

a module for obtaining first values of compensation coefficients for magnetic anomalies of a magnetometer installed in the aircraft, the compensation coefficients corresponding to the Euler angles associated with a rotation for changing from the reference coordinate frame of the magnetometer to the aircraft coordinate frame, and a set of modules, implemented in a flight phase of the aircraft, configured for implementing a refinement which includes an estimation of at least one compensation coefficient for vertical magnetic anomalies of the magnetometer, comprising:

a module for acquiring a plurality of magnetic field vector values measured by the magnetometer in-flight and associated attitude angle values of the aircraft, a module for calculating a magnetic heading as a function of the first values of compensation coefficients from the first step and acquired magnetic field vector values, a module for the recursive calculation of a slope coefficient, as a function of a difference in heading between the calculated magnetic heading and a reference magnetic heading, and values of the aircraft attitude angles, and a module for calculating a value of the compensation coefficient for vertical magnetic anomalies using a vertical bias estimator, using the calculated slope coefficient, the aircraft attitude angle values and characterizing values of a local terrestrial magnetic field;

wherein said device applies said compensation coefficient for vertical magnetic anomalies to compensate vertical magnetic anomalies of the magnetometer and to harmonize alignment of the magnetometer with respect to the aircraft coordinate frame, and updating a value of a compensated vertical component of the magnetic field, as a function of the calculated value of the compensation coefficient for vertical magnetic anomalies.

* * * * *